United States Patent [19]

Sawn

[11] 4,258,888
[45] Mar. 31, 1981

[54] QUICK RELEASING HIGH STRENGTH CONNECTOR

[75] Inventor: George W. Sawn, Clinton, Conn.

[73] Assignee: The United States of America as represented by the Secretary of the Navy, Washington, D.C.

[21] Appl. No.: 61,534

[22] Filed: Jul. 24, 1979

[51] Int. Cl.³ .............................................. B64F 1/12
[52] U.S. Cl. .......................... 244/17.17; 24/134 KB; 114/261; 244/115; 294/83 R; 294/110 B; 403/316; 403/330
[58] Field of Search ................... 244/17.17, 115, 116; 114/261; 294/83 R, 89, 110 B, 116; 403/316, 317, 322, 325, 330; 24/132 R, 132 WL, 133, 134 KB

[56] References Cited

U.S. PATENT DOCUMENTS

| 3,303,807 | 2/1967 | Stewart et al. ...................... 244/115 |
| 3,559,927 | 2/1971 | Baekken ............................... 244/115 |
| 3,661,416 | 5/1972 | Bukarkin et al. ................... 294/83 R |

Primary Examiner—Charles E. Frankfort
Attorney, Agent, or Firm—R. S. Sciascia; P. C. Lall

[57] ABSTRACT

A device for rapidly securing and releasing a helicopter is provided. The device effects positive haul down of an aircraft from a landing attitude above a landing pad aboard ship to a predetermined landing position on the pad, among other uses, through a plurality of rotatable spring-loaded over-center dogs clamped onto the free end of a haul-down cable and a sliding, cylindrical spring-loaded latching device which maintains the dogs in clamped relationship with the haul-down cable. The haul-down cable is instantly released upon freeing of the dogs.

12 Claims, 2 Drawing Figures

QUICK RELEASING HIGH STRENGTH CONNECTOR

The present invention relates to heavy load quick-releasing connectors and, more particularly, to a mechanism capable of effecting positive haul down of an airborne object to a predetermined position and instantaneous release thereafter.

In many applications it is necessary to insert a connector or coupling in a system between a rigid support, for example, and a large load. The connector could be incorporated in a system for effecting positive haul down of aircraft to landing pads particularly on board ships or in a system for supporting cargo in land, sea or air operations where a quick-acting release is essential for ready offloading. In some quick disconnect applications it is also necessary to release the load with a minimum of control force. In many locations for such applications it is necessary that the coupling or connector have a relatively small weight for the strength required and also a limited diameter and relatively short length of operation along the axis of the supporting cable.

Prior devices incorporating such connector applications have involved complicated structures that are relatively heavy and cumbersome and require a substantial actuating force to release heavy loads. These connectors require either comparatively long clamping dogs, a large amount of pivotal movement of such dogs, rotating a cam in different directions to actuate clamping members, or a cup mounted on a movable carriage on a ship's deck for receiving a retractable mooring cone among other disadvantages. These and other systems for similar applications lack the relative simplicity of applicant's device for quick release of heavy load carrying or aircraft haul-down cables.

Accordingly, it is an object of the present invention to provide a latching mechanism that is simple in operation, strong, light in weight, and has positive lock and instant release capabilities.

Another object of this invention is to provide cooperative devices for effecting in a simple and efficient manner haul down of an aircraft from a landing attitude above a landing pad on a ship to a predetermined landing position on the pad and instantaneous release thereafter as desired.

A further object of this invention is to provide an axial latching device that will grip a special heavy load or a haul-down cable fitting in such a manner as to resist high cable loads and yet instantly release and reset with very low unlatching pressure.

Other objects, advantages and novel features of the invention will become apparent from the following detailed description thereof when considered in conjunction with the accompanying drawings wherein.

Figure 1:
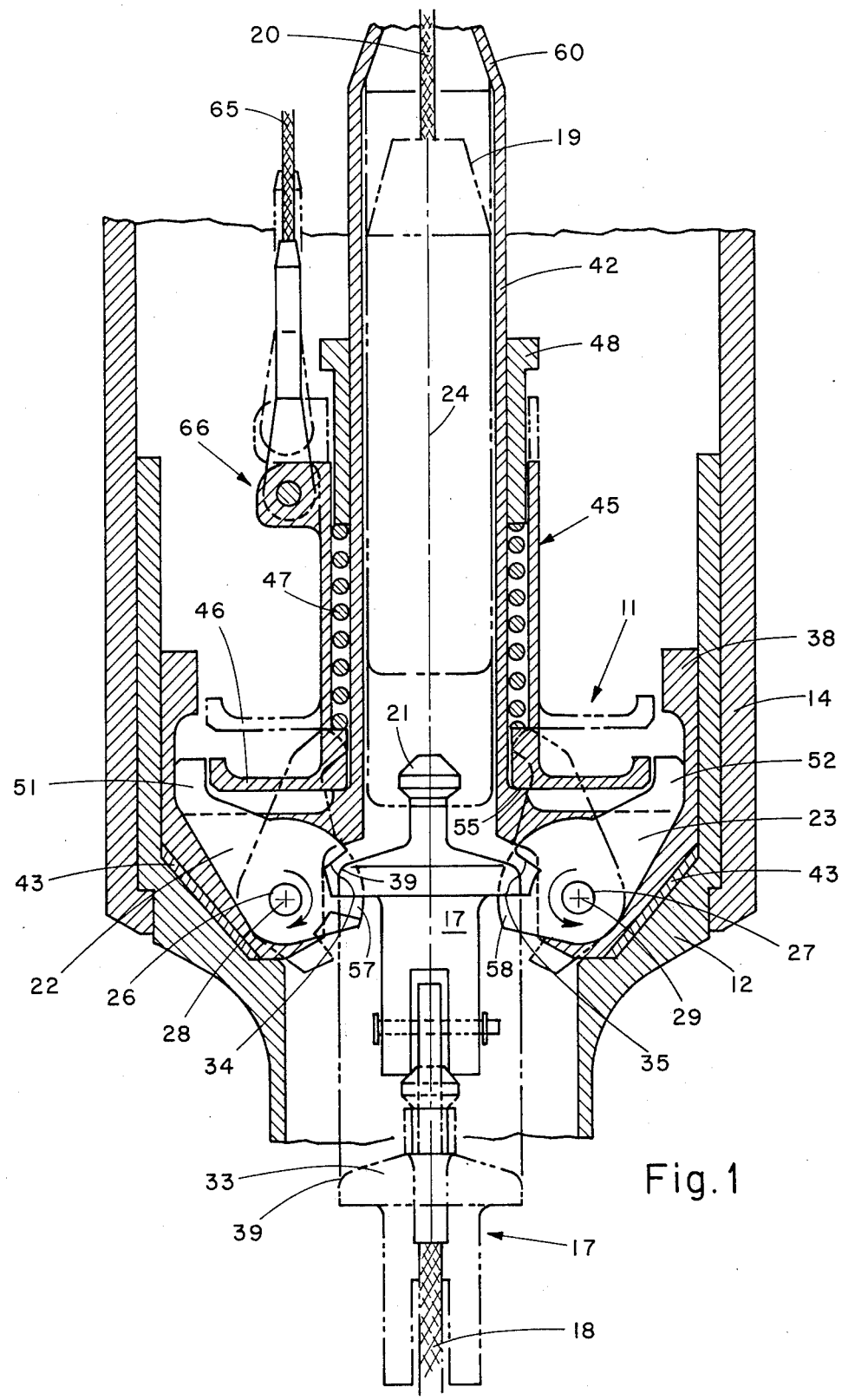
FIG. 1 is a sectional view of one embodiment of the present invention.
Figure 2:
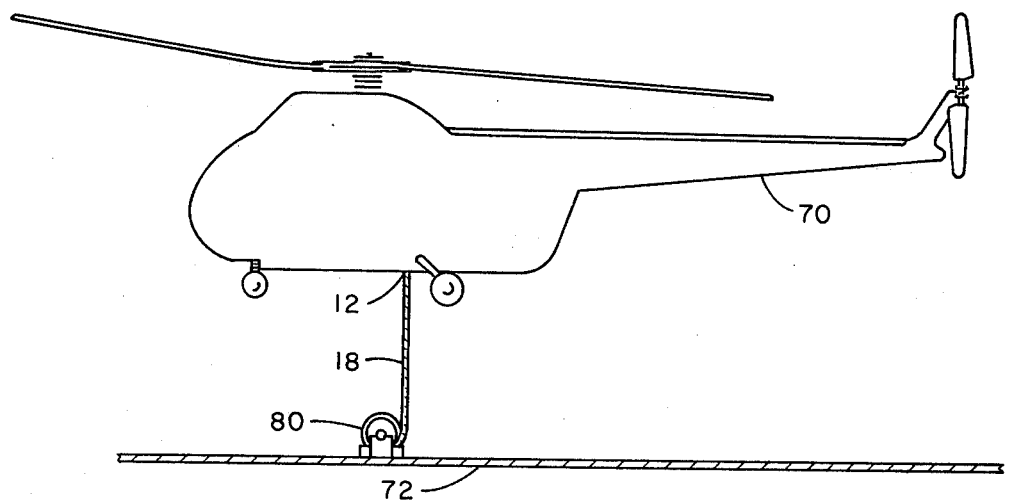
FIG. 2 is a pictorial view of a rotary-wing aircraft equipped with an embodiment of the present invention.

In the drawings, a latching mechanism 11 is shown secured within a housing 12 that is attached to a portion 14 of a helicopter or other aircraft 70 shown in FIG. 2. Mechanism 11 provides a positive hold and release for a special cable end fitting 17, for use in aircraft haul down, which is secured to a haul-down cable 18 that is paid out or hauled in via a winch 80 from a position on or adjacent to a landing pad on a ship, not shown, or at a stationary location 72. Fitting 17 in the upper position shown is lightly engaged inside the lower end of a guided break-away fitting 19 which is attached to a messenger cable 20 with fitting 17 having a head portion 21 that is inserted into break-away fitting 19 at the landing pad upon this fitting being lowered from the aircraft. The two fittings are separated after increased tension is applied via haul-down cable 18. A plurality of spring-biased over-center dogs 22 and 23 symmetrically spaced about a longitudinal axis 24 and normally in the closed position shown in phantom are mounted for rotation on pins 26 and 27 about axes 28 and 29 in latching mechanism 11. The dogs are rotated outward when fitting 17 is hauled into mechanism 11 upon a flange 33 on the fitting contacting and forcing upward respective shoulders 34 and 35 on dogs 22 and 23. The shoulders and flange overlap sufficiently to rotate the dogs until they are stopped by a housing 38 as a rounded edge 39 of the flange clears the dog shoulders. A lock housing 42, which is secured to the aircraft via an intermediate member 43 and housing 12 and in which pins 26 and 27 are mounted, is adapted to slidably receive break-away fitting 19 and a spring-biased latching device 45 which includes a latching ring 46, a spring 47 which biases device 45 and a spring stop 48. Rotation of the dogs causes extensions 51 and 52 thereof to bear against in a rotary motion the under surface of ring 46, forcing latching device 45 upward until the extensions clear the periphery of ring 46 whereupon the ring is forced by spring 47 into a locking position between outwardly deployed extensions 51 and 52 and into abutment against a shoulder 55 on housing 42. In this position the spring-biased dogs are blocked from rotation and in addition position a plurality of stops 57 and 58 in the downward path of flange 33, effectively and positively holding fitting 17 in mechanism 11 when a sufficient haul-down force is exerted on cable 18. With fitting 17 so held, hauling down on cable 18 draws housing 42 downward until break-away fitting 19 is arrested by a tapered surface 60 of housing 42 at which time head 21 is pulled from break-away fitting 19. Haul-down cable 18 and fitting 17 are released by pulling upward on a release cable 65 which is connected to latching device 45 preferably by a pivotable coupling 66. When device 45 is moved upward a short distance extensions 51 and 52 are unblocked causing dogs 22 and 23 to rotate these extensions inward toward axis 24 and stops 57 and 58 away therefrom thereby releasing fitting 17.

In operation, cable 20 having break-away fitting 19 secured thereto is manually connected to special fitting 17 which is attached to the free end of haul-down cable 18. As cable 18 is drawn into latching mechanism 11, fitting 17 contacts shoulders 34, 35 on each of a plurality of spring-biased over-center dogs 22, 23 causing the dogs to rotate which then allows spring-biased latching device 45 to slide down the outer surface of lock housing 42 and bottom on surface 55, thus locking fitting 17 in the latching mechanism. Messenger cable 20 and break-away fitting 19 continue to retract causing this fitting to break away from special fitting 17, due to increased tension, and continue to move upward until the break-away fitting is stopped at tapered surface 60 of lock housing 42. At this point the mechanism is operable to either haul down an aircraft in the attitude of the device shown or in an alternate use hoist a load where the attitude is inverted and the load is secured to a frame which would be the equivalent of aircraft portion 14. In the embodiment shown and described haul-down cable 18 is released by pulling upwardly on release cable 65, causing latching ring 46 to move away from dogs 22, 23 thereby permitting them to rotate and releasing special fitting 17 which falls away due to its own weight. The dogs remain in this, the at rest, position until the next time the messenger cable is used to draw in a haul-down cable at which time the cycle is repeated.

It will thus be appreciated that although the invention has been shown and described in relation to helicopter or other aircraft haul down to launching pads, it is also applicable to situations in which heavy loads are to be raised and lowered wherein quick release after raising or lowering is essential. That is, the action can be reversed so that a load is raised instead of an aircraft hauled down without changing the operation of and cooperation between components. Portion 14 of an aircraft would be replaced by a hoist frame or other load carrying member. Messenger cable 20 would be hauled upward with head 21 engaged in break-away fitting 19, and the load would be lifted via stops 57 and 58 and released by an upward pull on cable 65. The invention is also applicable to movement or restraint of horizontal loads so long as the cables are kept clear until sufficient tension has been applied thereto. Such loads would involve towing vehicles or restraint of the thrust of rocket motors or jet engines.

There is thus provided an axial latching means that will grip a special cable fitting in such a manner as to resist high cable loads and yet instantly release and reset with very low unlatching pressure. The present means replaces rotary devices which operate with cams and springs, require a large diameter housing to contain its components, and require high unlatching pressures among other disadvantages. Such disadvantages are overcome by the simplicity of operation, strength, positive lock, instant release, and light weight of the present invention.

What is claimed is:

1. A coupling for use in landing and/or securing a movable object to or adjacent to a fixed or floating structure, comprising:
   a cylindrical housing adapted to be secured to said movable object;
   hauling means mounted on said structure and a hauling cable on said hauling means;
   a fitting secured to the free end of said cable;
   a messenger line having a cable break-away member secured thereto adapted to releasably grasp said fitting and draw said fitting axially into said housing;
   actuable means secured in said housing adapted to be manipulated by said fitting from an inoperative position to a locked operative position upon said fitting being drawn into said housing by said messenger line;
   releasable locking means in said housing adapted to lock said actuable means in the operative position after being manipulated by said fitting,
      said actuable means in the operative position having means for stopping withdrawal of said fitting so that hauling forces on said hauling cable are transmitted to said housing; and
   a release cable secured to said releasable locking means for releasing said actuable means upon a selected displacement of said releasable locking means whereupon said fitting is removed from said break-away member and released from said housing.

2. The coupling as defined in claim 1 and further including a lock housing in said cylindrical housing for accommodating said break-away member,
   said lock housing having means remote from said actuable means for arresting said break-away member after selected axial travel in said cylindrical housing,
      said arresting means effecting separation of said fitting and said break-away member upon a selected tension being applied to said hauling cable.

3. The coupling as defined in claim 2 wherein said actuable means include a plurality of spaced spring-biased over-center dogs pivotable about axes lying in a plane which is perpendicular to the longitudinal axis of said cylindrical housing,
   said dogs having a first shoulder positioned to be intercepted by said fitting when drawn into said housing and a second shoulder positioned to stop withdrawal of said fitting upon locking of said actuable means by said releasable locking means.

4. The coupling as defined in claim 3 wherein said releasable locking means is a spring-biased lock ring,
   said lock ring urged axially into said cylindrical housing by said dogs upon said fitting being drawn into said cylindrical housing,
   said dogs having a recess and said lock ring urged into said recesses by spring action when said dogs are in the operative position,
   said release cable secured to said lock ring.

5. A system for effecting quick release of cable carrying heavy loads, comprising:
   a cylindrical main housing and a plurality of spaced spring-biased dogs mounted for partial rotation therein at one end thereof about respective axes lying in a plane perpendicular to the longitudinal axis of said main housing,
      said dogs in the inoperative position having a first shoulder deployed toward said axis at said one end of said main housing and a locking extension chamfered on one side deployed toward said axis remote from said first shoulder;
   a messenger cable having a load-carrying member releasably connected thereto and adapted to be hauled through said main housing along said axis;
   a flange on said member having a chamfered leading surface adapted to contact said first shoulder;
   a spring-biased latch housing symmetrically mounted in said main housing about said axis and having a base locking ring extending transverse to said axis and contacting said extensions in the operative position,
      said dogs having a second shoulder positioned to extend transversely toward said axis in the operative position thereof;
   a hauling cable secured to said member remote from said flange; and
   a release cable secured to said latch housing,
      whereby when said member is drawn into said main housing by hauling on said messenger cable said first shoulder will contact and axially rotate said dogs causing said chamfered extensions to bear against and across said base locking ring until clear thereof whereupon said base will lock said dogs in the operative position and hauling on said hauling cable will bring said flange to bear against said second shoulders and transfer hauling forces to said main housing, said dogs and said member released by hauling on said release cable until said base locking ring clears said extensions.

6. The system as defined in claim 5 wherein said messenger cable includes a guided break-away fitting and said latch housing forms a longitudinally extending guide for said fitting;

means in said guide for limiting axial movement of said fitting therethrough at the end remote from said one end of said main housing;

means in said fitting remote from said limiting means for releasably retaining said load-carrying member; and means in said load-carrying member for releasably engaging said fitting, whereby said member is engaged in said fitting when hauled into said main housing and is released from said fitting upon said fitting being stopped by said limiting means and a sufficient tension is applied to said messenger cable or said hauling cable to withdraw said member from said fitting.

7. The system as defined in claim 6 wherein said guide includes a shoulder adjacent said one end of said housing for limiting movement of said base locking ring upon clearance thereof by said dog extensions.

8. The system as defined in claim 7 wherein said main housing has a reduced diameter entrance extending from said one end for receiving said member, said dog axes are substantially tangent to said reduced diameter projected axially within said main housing, said guide is circular and tapered at one end and said limiting means is an inwardly tapering surface of said circular guide conforming to said tapered guide end.

9. A device for rapidly securing and releasing aircraft of the rotor sustaining or hovering type to a structure either fixed or mounted on a floating object comprising:

a haul-down cable and means mounted at or near said structure for paving out and hauling in said cable;

a fitting secured to the free end of said cable, said fitting having means for enabling transport of said cable to said aircraft and thereafter releasable engagement with said aircraft for haul down to said structure;

a cylindrical housing secured to said aircraft and a plurality of spaced spring-biased over-center dogs pivotally mounted in said housing about the longitudinal axis thereof;

means including a messenger line having a fitting-engaging member in said aircraft adapted to releasably engage and haul said fitting into said housing;

first cooperating means in said fitting and said dogs for effecting rotation of said dogs from an initial inoperative position upon passage of said fitting into said housing;

means in said housing for locking said dogs in the operative position;

second cooperating means in said fitting and said dogs for blocking withdrawal of said fitting while said dogs are in the operative position so that hauling forces on said haul-down cable are transmitted to said aircraft via said housing; and means for disengaging said locking means and freeing said dogs, whereby a hovering aircraft may be hauled down to a landing area by first paying out said messenger line and connecting it to said fitting, next hauling said fitting with said haul-down cable attached into said housing and rotating said dogs to the operative position, then hauling on said haul-down cable until said aircraft is brought to the desired landing position, and finally disengaging said locking means and freeing said fitting.

10. The device as defined in claim 9 and further including a lock housing in said cylindrical housing for accommodating said fitting-engaging member, said lock housing having means remote from said dogs for arresting said fitting-engaging member after selected axial travel in said cylindrical housing, said arresting means effecting separation of said fitting and said fitting-engaging member upon a selected tension being applied to said haul-down cable.

11. The device as defined in claim 10 wherein said means for locking said dogs in the operative position is a spring-biased lock ring, said lock ring contacting said dogs and urged axially into said cylindrical housing by said dogs upon said fitting contacting said dogs on being drawn into said cylindrical housing, said dogs having a recess and said lock ring urged into said recesses by spring action when said dogs are in the operative position, said means for disengaging said locking means including a release cable secured to said lock ring.

12. A system for effecting quick release of cables carrying heavy loads such as aircraft haul-down cables, comprising:

a housing adapted to be secured in an aircraft of the rotor sustaining or hovering type;

a haul-down cable for hauling said aircraft down to a landing surface;

a latching mechanism centrally mounted in said housing and including a central lock housing adapted internally to receive and guide a member releasably engageable with said haul-down cable;

a spring-biased locking means in said latching mechanism and means at one end of said lock housing for limiting movement of said locking means;

a guided break-away member in said lock housing and a messenger cable secured thereto, said latching mechanism further including a plurality of spring-biased over-center dogs pivotally mounted in said housing adjacent said one end of said locking means, said haul-down cable including an end fitting adapted to rotate said dogs when hauled into said lock housing and said dogs adapted to arrest subsequent cable movement in the opposite direction, said dogs releasably locked in the cable-arresting position by said locking means upon being selectively rotated by said movement into said housing of said cable end fitting; and release means secured to said locking means for disengaging said locking means from said dogs by withdrawal therefrom, said end fitting engaged by said break-away member upon lowering of said messenger cable to the landing surface area and removed therefrom upon a selected tension being applied to said haul-down cable after being arrested by said dogs.

* * * * *